United States Patent
Rittershofer et al.

(10) Patent No.: US 9,717,182 B2
(45) Date of Patent: Aug. 1, 2017

(54) FEEDERHOUSE FOR A COMBINE HARVESTER HAVING FLEXIBLE TRACTION MEANS AND REMOVABLE THREADED BOLTS FOR MOUNTING CONVEYING STRIPS

(71) Applicant: DEERE & COMPANY, Moline, IL (US)

(72) Inventors: Martin Rittershofer, Kaiserslautern (DE); Volker Fuchs, Saarburg (DE); Van Wolde Harm-Jan, Veendam (NL); Arjan Mulder, Veendam (NL)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/703,449

(22) Filed: May 4, 2015

(65) Prior Publication Data
US 2016/0037724 A1     Feb. 11, 2016

(30) Foreign Application Priority Data
Aug. 8, 2014     (DE) .......................... 10 2014 215 762

(51) Int. Cl.
*B65G 15/54*     (2006.01)
*A01F 12/10*     (2006.01)
(Continued)

(52) U.S. Cl.
CPC ............ *A01F 12/10* (2013.01); *A01D 61/008* (2013.01); *A01D 61/02* (2013.01)

(58) Field of Classification Search
CPC ...... B65G 15/52; B65G 17/063; B65G 15/42; B65G 15/44; B65G 17/067; A01D 17/10;
(Continued)

(56) References Cited

U.S. PATENT DOCUMENTS 2,108,486 A * 2/1938 Hansson ................ A01D 61/02
198/846
2,716,481 A * 8/1955 Dray .................... A01D 61/008
198/699

(Continued)

FOREIGN PATENT DOCUMENTS

BE       864412 A  * 6/1978  ............ A01D 17/10
DE    3246528 A1  * 6/1984  ............ A01D 61/02
(Continued)

Primary Examiner — Árpád Fábián-Kovács
(74) Attorney, Agent, or Firm — Rathe Lindenbaum LLP

(57) ABSTRACT

A feederhouse for a combine harvester comprises an endless conveyor having at least two traction means made of inherently flexible material circulating about the deflection rollers and offset from one another in the axial direction of the deflection rollers, between which conveying strips extend. The inner sides of the traction conveying strips are furnished with cams made of inherently flexible material. Anchor plates are embedded in each of the cams. A first fastener having a first head recessed within the individual cam extends through individual cams, through individual anchor plates and through individual conveying strips. The anchor plate comprises two non-circular openings, wherein the first fastener and the second fastener each have non-cylindrical outer circumferential surfaces received within the non-circular openings to inhibit rotation of each of the first fastener and the second fastener relative to the anchor plate.

20 Claims, 3 Drawing Sheets

(51) Int. Cl.
*A01D 61/00* (2006.01)
*A01D 61/02* (2006.01)

(58) Field of Classification Search
CPC ............ A01D 2017/103; A01D 61/008; A01D 61/02; A01D 2017/106; A01F 12/10; A01F 29/10
USPC ........... 198/848, 817, 698, 732; 460/16, 114
See application file for complete search history.

(56) References Cited

U.S. PATENT DOCUMENTS

| | | | | |
|---|---|---|---|---|
| 2,743,829 | A | | 5/1956 | Ballard |
| 3,282,404 | A | * | 11/1966 | Corwith ................... A01F 29/10 198/620 |
| 3,976,192 | A | * | 8/1976 | Muller ................... B65G 15/52 198/803.2 |
| 4,023,671 | A | * | 5/1977 | Kramer ................... F16G 3/08 198/699 |
| 4,553,663 | A | * | 11/1985 | Johnson ................ A01D 61/02 198/465.1 |
| 4,653,632 | A | * | 3/1987 | Timmer ................. A01D 17/10 198/822 |
| 4,697,693 | A | * | 10/1987 | Rajala ................... B65G 15/42 198/698 |
| 4,724,909 | A | * | 2/1988 | Link ....................... A01D 17/10 171/126 |
| 4,899,868 | A | * | 2/1990 | Johnson ................ A01D 61/02 198/520 |
| 4,908,002 | A | * | 3/1990 | Tanis ..................... B65G 19/24 198/731 |
| 5,346,429 | A | * | 9/1994 | Farley .................... A01D 61/04 460/16 |
| 5,478,277 | A | * | 12/1995 | Kloefkorn .............. A01D 61/04 460/114 |
| 5,480,352 | A | * | 1/1996 | Luscombe .............. A01D 17/10 198/731 |
| 5,671,839 | A | * | 9/1997 | Sanderson ............. A01D 17/10 198/846 |
| 5,692,598 | A | * | 12/1997 | Rohrs .................... A01D 17/10 198/848 |
| 5,738,204 | A | * | 4/1998 | Baumgartner ......... B65G 15/44 198/732 |
| 5,738,223 | A | * | 4/1998 | Rohrs .................... A01D 17/10 198/848 |
| 5,976,013 | A | * | 11/1999 | Hamann ............... A01D 61/008 460/114 |
| 6,106,391 | A | * | 8/2000 | Tjabringa .............. A01D 17/10 198/848 |
| 6,896,125 | B2 | * | 5/2005 | Webster ................. B65G 15/52 198/844.2 |
| 6,922,983 | B2 | * | 8/2005 | Gryspeerdt .......... A01D 61/008 198/550.12 |
| 7,473,168 | B2 | * | 1/2009 | Day ....................... A01D 61/04 460/16 |
| 7,766,736 | B2 | * | 8/2010 | Ramp .................... A01F 12/10 460/16 |
| 8,701,870 | B1 | * | 4/2014 | Farley .................... B60P 1/36 198/727 |
| 9,033,138 | B2 | * | 5/2015 | Mulder .................. A01D 61/10 198/848 |
| 9,301,450 | B2 | * | 4/2016 | Boyd ................... A01D 61/008 |
| 9,481,522 | B2 | * | 11/2016 | Gough ................ B65G 17/067 |
| 2004/0211650 | A1 | * | 10/2004 | Linder ................... B65G 19/24 198/841 |
| 2004/0250523 | A1 | * | 12/2004 | Schulz ................... A01F 12/10 56/153 |
| 2005/0109000 | A1 | * | 5/2005 | Mulder .................. A01D 17/10 56/16.4 R |
| 2012/0186949 | A1 | * | 7/2012 | Gentz ................... B65G 15/52 198/817 |
| 2014/0367230 | A1 | * | 12/2014 | Jager ..................... B65G 15/48 198/850 |

FOREIGN PATENT DOCUMENTS

| | | | | |
|---|---|---|---|---|
| DE | 3338792 | A1 | * 5/1985 | ............ A01D 17/10 |
| DE | 102009036104 | | 2/2011 | |
| EP | 212146 | A1 | * 3/1987 | ............ A01D 17/10 |

* cited by examiner

FEEDERHOUSE FOR A COMBINE HARVESTER HAVING FLEXIBLE TRACTION MEANS AND REMOVABLE THREADED BOLTS FOR MOUNTING CONVEYING STRIPS

FIELD OF THE INVENTION

The invention pertains to feederhouses for combine harvesters. More particularly it relates to feederhouse conveying mechanisms.

BACKGROUND OF THE INVENTION

Combine harvesters are used for harvesting the crops of agriculturally grown plants, which are received by means of an agricultural harvesting head and conveyed by a feederhouse into the actual combine harvester. There the plants are threshed and the obtained useful parts are cleaned. Feederhouses comprise a housing, in which an endless conveyor having a plurality of traction means arranged laterally one next to another circulates about a lower and an upper deflection roller and conveys the material in an undershot manner upwards into the combine harvester. The endless conveyor comprises conveying strips, each of which is fixed to two traction means, in order to convey the material.

DE 10 2009 036 104 A1, which is considered to define the type of device in question, describes a feederhouse, the traction means of which consist of endless wound cam belts made from fabric-reinforced cross-linked polymer. Cams (variously called "teeth" or "lugs") are arranged on the inner side of the cam belt and cooperate with cam wheels, of which one is used for driving the belt. The conveying strips are connected to the cam belt by threaded bolts, wherein the heads of the bolts are each vulcanized into a cam and contact an anchor plate having a larger surface area, which is likewise integrated into the cam. The bolts extend through holes in the belt, into which holes bushings can be inserted, and are used for attaching a conveying strip to the outer surface of the belt. In another embodiment, the conveying strips are fastened between two adjacent cams by screws or rivets.

In the embodiment having heads vulcanized into the cam, there is the disadvantage that replacement of a defective threaded bolt is not possible. Replacement is conceivable for the other embodiment, but in this case there is the disadvantage that the bolt head and the anchor plate are arranged between two adjacent cams on the drive side of the belt, which has the effect that the cam wheels cannot penetrate into the bottom of the belt between the cams, which limits the torque transmission.

U.S. Pat. No. 2,743,829 A describes a street cleaning vehicle having an endless conveyor that is composed of two cam belts, which circulate about deflection rollers and are connected to one another by driving strips. The driving strips are attached by threaded bolts embedded in removable cams. The cams are located on the inner side of the cam belt. The threaded bolts are welded (or fixed in some other manner) to retaining plates in the cams, which fix the threaded bolts in the removable cam. The threaded bolts extend through the belt and through bores in the driving strips, which are fixed to the belt by nuts.

U.S. Pat. No. 4,697,693 A describes another endless conveyor having cam belts and screwed-on conveying strips. The heads of the screws contact plates, which in turn contact the outer surface of the cams. The actual screws extend through bores in the plates, through the cams and the belt and through holes in the conveying strips and are fixed by nuts.

In the conveyors according to U.S. Pat. Nos. 2,743,829 A and 4,697,693 A, the cams having the threaded bolts or screws are removable, so that the fastening means of the driver strips can be replaced in case of damage, but only entire cams can be replaced in U.S. Pat. No. 2,743,829 A and a welded joint is provided between the retaining plate and the threaded bolts, while in U.S. Pat. No. 4,697,693 A there is no torque-transmitting connection between the plates and the screws, so that the screw heads must be held fixed by separate retaining means (wrench) when tightening the nuts.

It is an object of this invention to address the problem of providing an improved feederhouse which does not have the above-mentioned disadvantages or has them only to a reduced extent.

SUMMARY OF THE INVENTION

In accordance with one aspect of the invention, a feederhouse for a combine harvester is provided comprising a housing having a lower deflection roller and an upper deflection roller, at least one of which can be set into rotation about the longitudinal axis thereof by a drive unit, and an endless conveyor having at least two traction means made of inherently flexible material circulating about the deflection rollers and offset from one another in the axial direction of the deflection rollers, between which traction means conveying strips distributed along the length of the traction means extend. The inner sides of the traction means are furnished with cams made from inherently flexible material, which interact with the drivable deflection roller so as to transmit torque. The conveying strips are connected by threaded bolts to the traction means. The threaded bolts have heads that are each embedded into one of the cams and contact an anchor plate integrated into the cam. The threaded bolts extend through holes of the anchor plate and the traction means. The threaded bolts are removable from the traction means. Thereby a replacement of a damaged threaded bolt, and thus repair of the feederhouse, is possible without exchanging the traction means. In the regions of the threaded bolts that extend through the holes of the anchor plates, the threaded bolts are form-fittingly coupled to the anchor plate, in order to secure the threaded bolts against rotational movement. Therefore it is possible to tighten the nut on the outer side of the conveying strips without additional tools for immobilizing the threaded bolt.

In one possible embodiment, the cams provided with the threaded bolts can be removed from the traction means. In this case, the threaded bolts can be connected so as to be removable from the cams or can be non-detachably connected thereto (particularly as described in the following paragraph).

In another embodiment, the cams furnished with the threaded bolts are non-detachably connected to the traction means and the threaded bolts can be removed from the cams, in particular through an internal opening of the cam adjacent to the head of the threaded bolt.

The axial dimension of the regions in which the threaded bolts extend through the holes of the traction means can correspond at least to the thickness of the traction means. In these regions, the threaded bolts are preferably cylindrical, which avoids damaging of the traction means by the threaded bolts. The diameter of the threaded bolts can also be greater than the thread diameter of the threaded bolts and the diameter of an opening in the conveying strip through which the threaded bolt extends. This has the effect that the conveying strip cannot be tightened more strongly than is compatible with the service life of the traction means.

BRIEF DESCRIPTION OF THE DRAWINGS

An embodiment of the invention, to be described below, is shown in the drawings, in which.

DETAILED DESCRIPTION OF THE PREFERRED EMBODIMENTS

Figure 1:
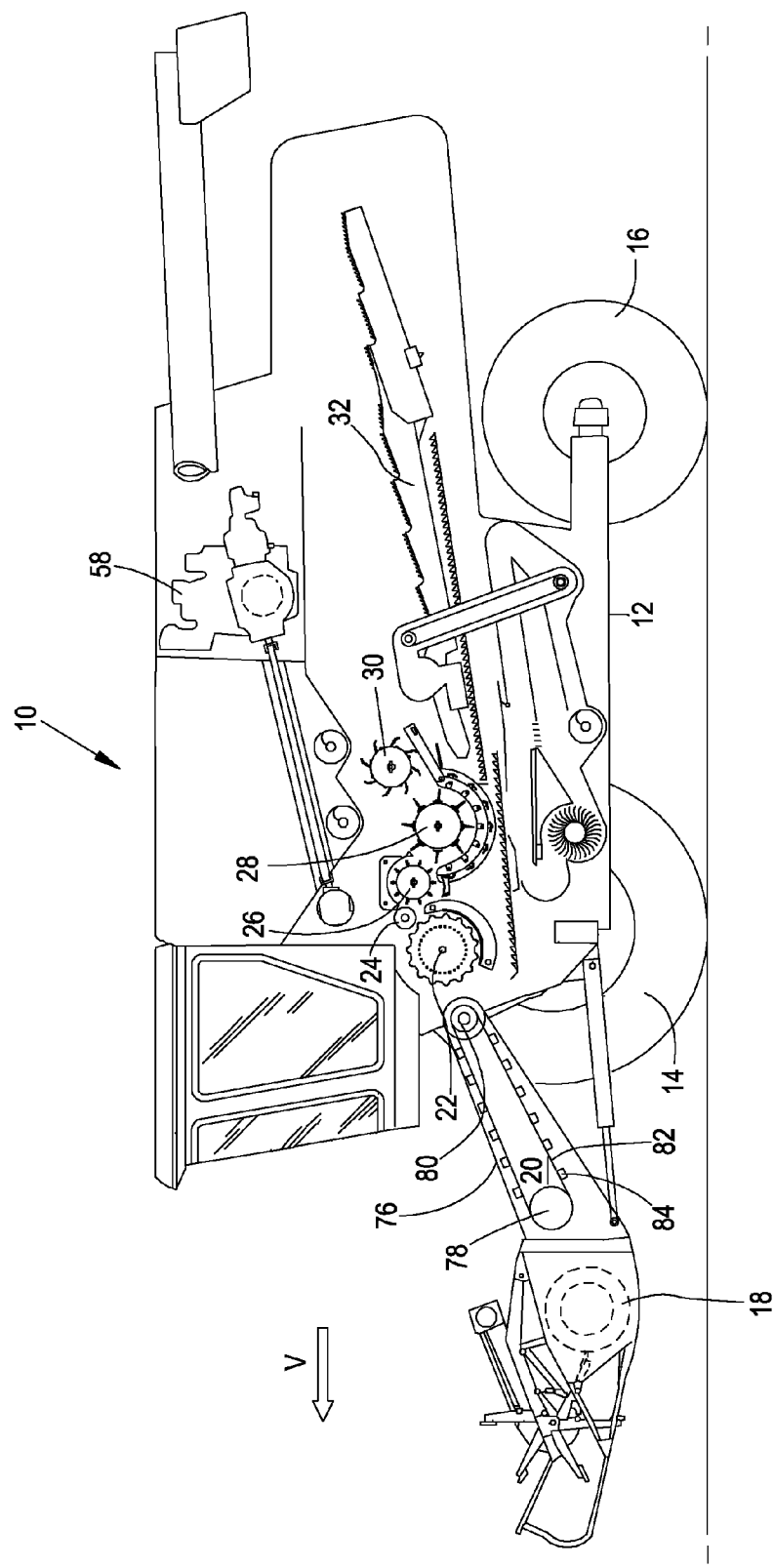
FIG. 1 shows a schematic side view of a combine harvester having a feederhouse.

FIG. 1 shows a self-propelled combine harvester 10 with a frame 12 that is supported on the ground via driven front wheels 14 and steerable rear wheels 16 and propelled thereby. The wheels 14 are driven by drive means, not shown in detail, in order to move the combine harvester 10 on a field to be harvested, for example. Directional indications such as front and rear refer below to the travel direction V of the combine harvester 10 during harvesting operation.

An agricultural harvesting head 18 is removably connected to the front end area of the combine harvester 10 (and in particular, to the front end of a feederhouse 20) in order to harvest crop in the form of grain or other threshable crops from the field and feed it upwards and to the rear by means of the feederhouse 20 to a multi-drum threshing mechanism that comprises—arranged in succession in the travel direction V—a threshing drum 22, a stripper drum 24, an overshot drum conveyor 26, a tangential separator 28 and a turning drum 30. A straw walker 32 is located downstream of the turning drum 30. Any other desired threshing and separating apparatus can be used in place of the multi-drum threshing mechanism shown. The rear end of the feederhouse 20 is coupled to and supported on the combine harvester 10.

The feederhouse 20 comprises a housing 76, at the lower, front end of which a lower deflection roller 78 is arranged, and at the upper, rear end of which an upper deflection roller 80 is arranged. Both deflection rollers 78, 80 extend horizontally and transversely to the forward direction. Traction means 82 in the form of belts made of inherently flexible material, of which two, three or more can be arranged spaced laterally apart from one another, circulate about the deflection rollers 78, 80. At least one of the deflection rollers 78, 80 is connected by a drive train to an internal combustion engine 58 in order to be set into rotation during harvesting operation. Conveying strips 84 extend between adjacent traction means 82. The conveying strips 84 are screwed detachably to the traction means 82. During harvesting operation, the feederhouse 20 operates in undershot manner, i.e. the crop is pulled underneath the traction means 82 upwards on the bottom of the housing 76 of the feederhouse 20.

The traction means 82 themselves correspond to the cam belts known from DE 10 2009 036 104 A1, the disclosure of which is hereby incorporated in full into the present documents by reference. The reader is now referred to FIG. 2. On the inner side of the traction means 82, cams 34, 36 are arranged, which are used for transmitting the drive torque of the driven deflection roller 78 or 80. For this purpose, the driven deflection roller 78 or 80 is equipped with drive elements that engage between adjacent cams 34, 36.

Figure 5:
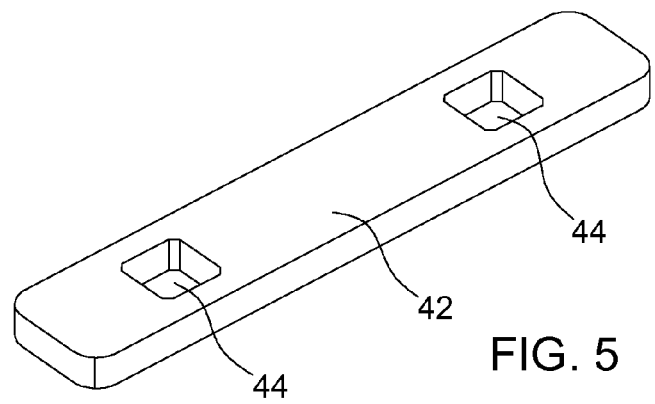
FIG. 5 shows a perspective view of an anchor plate.

While some cams 34 (shown at the right in FIG. 2) are fixedly attached to (e.g. vulcanized onto) the traction means 82 and consist of solid material, other cams 36 are used additionally for mounting the conveying strips 84 by means of threaded bolts 40. These cams 36 are constructed separately from the traction means 82 and can be removed therefrom. They are fastened to the traction means 82 by the threaded bolt 40. The cam 36 is substantially trapezoidal in shape and consists of inherently flexible material. An anchor plate 42 is embedded in the cam 36 and is closely adjacent to the traction means 82 in the installed state and oriented parallel thereto, but separated therefrom by material of the cam 36. The anchor plate 42 itself is flat and cuboid-shaped and is provided with two square holes 44, cf. FIG. 5. The cam 36 comprises an axial cylindrical opening 46, which extends from the outer surface of the cam 36 (drawn at the bottom in FIG. 2) to the anchor plate 42.

Figure 4:
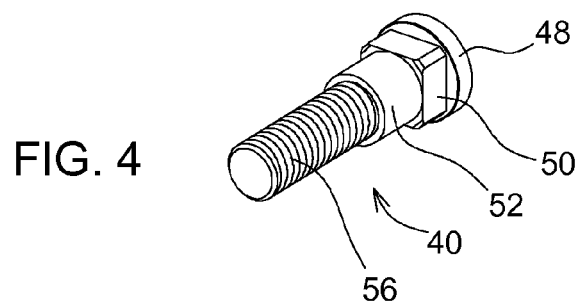
FIG. 4 shows a perspective view of a threaded bolt.

The threaded bolt 40 is shown in perspective in FIG. 4. It comprises a circular, relatively shallow head 48, which is adjoined by a substantially square region 50 (with rounded corners) of the threaded bolt 40. In the mounted state, this region 50 contacts the inner walls of the holes 44 of the anchor plate 42, while the head 48 arranged in the opening 46 rests axially against the outer surface of the anchor plate 42. The region 50 is adjoined by a cylindrical region 52 of the threaded bolt 40. In the installed state, this region 52 extends inside a hole 54 of the traction means 82. The axial length of the region 52 corresponds approximately to the thickness of the traction means 82. Finally, the region 52 is adjoined by a shank 56 of the threaded bolt 40, which can be furnished with a thread over its entire length (as shown in the figures) or only in an outer region (not shown) remote from the head 48. The shank 56 extends through a lower opening 60 of the conveying strip 84, shown here as a square profile, and through a washer 62 positioned on the upper side of the profile, against which a nut 64 screwed onto the thread of the shank 56 rests. An upper opening 60 in the conveying strip 84 enables access to the nut 64, which is situated inside the hollow rectangular profile of the conveying strip 84.

The diameter of the shank 56 and also of the opening 60 of the conveying strip 84 is smaller than the diameter of the region 54 inside the hole 54 of the traction means 82. The nut 64 therefore cannot be tightened more tightly than is necessary for secure fastening of the conveying strip 84 and the cam 36 to the traction means 82, so that the latter cannot be damaged by an excessively strong tightening of the nut 84. Differently than in FIG. 2, the region 52 could also extend up to just before the outer surface of the traction element 82, drawn at the top in FIG. 2.

Figure 3:
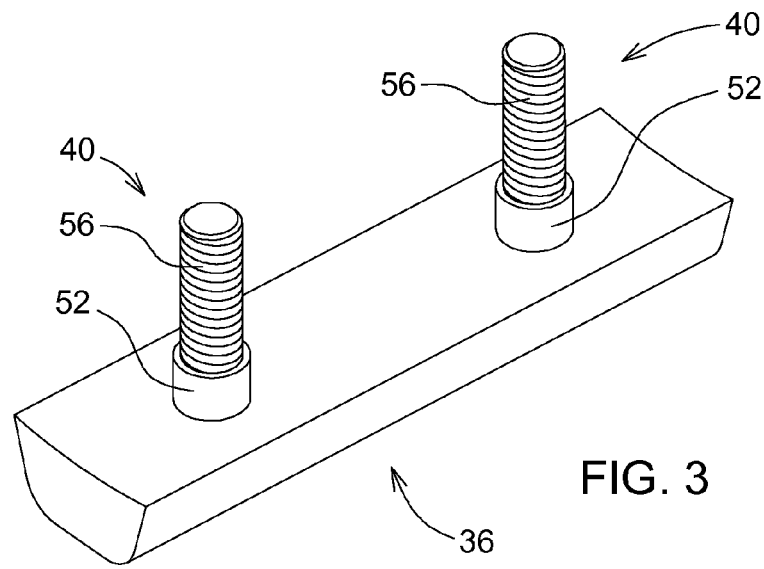
FIG. 3 shows a perspective view of a cam having threaded bolts attached thereto.

FIG. 3 shows the cam 36 in a perspective view. It is equipped with two threaded bolts 40, which extend through associated holes 54 positioned one alongside another laterally in the traction means 82. The cam 36 is secured non-rotationally on the traction means 82 by means of the two threaded bolts 40.

According to the above, the following procedure results if the threaded bolt 40 is damaged during harvesting operation, for example by the introduction of a stone into the feederhouse 20. After unscrewing the nuts 64 and removing the washers 62 and the conveying strip 84 (to the extent that these measures are still necessary), the entire cam 36 (i.e. along with the threaded bolts 40) can be removed from the traction means 82. Then the bolt 40 to be replaced is removed downward in relation to the orientation shown in FIG. 2 through the opening 46 and is replaced by a new threaded bolt 40. Alternatively, the entire cam 36, along with the two threaded bolts 40, can be replaced, or the cam 36 remains on the traction means 82, while only a single (or both) threaded bolts 40 are exchanged. Finally the cam 36 or the threaded bolt 40 is brought into the position shown in FIG. 2 and the conveying strip 84, the washer 62 and the nut 64 are positioned and the latter is tightened.

Because of the positive engagement between the region 50 of the threaded bolt 40 and the hole 44, it is not necessary to hold the threaded bolt 40 stationary in order to prevent a rotation about the axis of the bolt.

Figure 2:
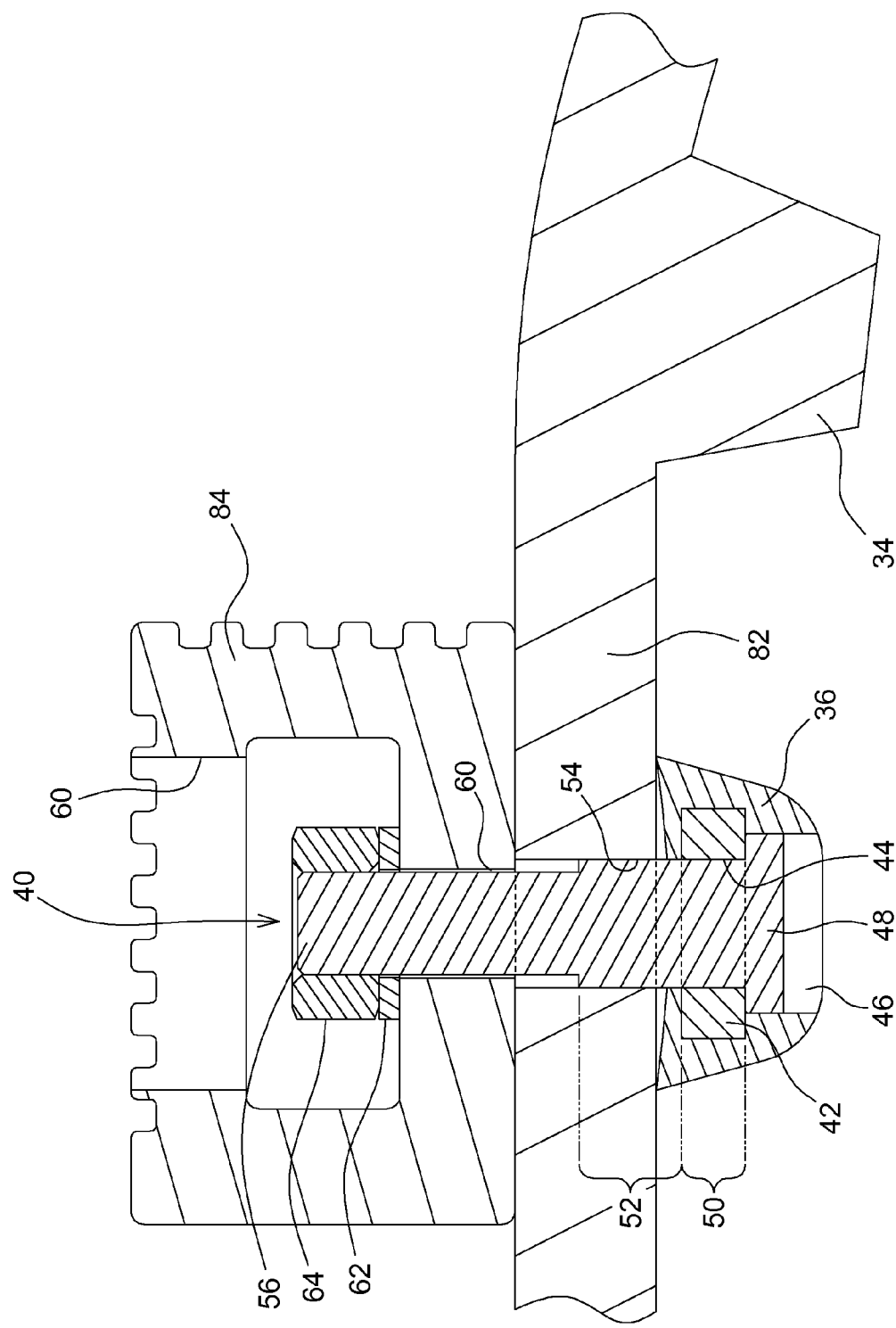
FIG. 2 shows a section through the traction means of the feederhouse and a conveying strip fastened thereto.

In FIGS. 2 and 3, the surface of the cam 36 coming into contact with the traction means 82 is not completely flat, but is instead curved convexly, which results in a certain deformation of the cam 36 and/or the traction means 82 when the nut 64 is tightened, contributing to the fixation of the cam 36 on the traction means 82. It would also be conceivable to give this surface of the cam 36 a flat shape, however. As shown by FIG. 2, cam 36 has a concave surface facing away from anchor plate 48 and abutting traction means 82.

The invention herein is defined by the claims, not by the figures and description. The figures and description are provided to illustrate one or more embodiments of the claims.

The invention claimed is:

1. A feederhouse for a combine harvester, wherein the feederhouse is coupled to a combine harvester at its upper, rear end and is configured to be coupled to an agricultural harvesting head at its lower, front end, the feederhouse comprising:
   a housing having a lower deflection roller and an upper deflection roller, at least one of which can be set into rotation about the longitudinal axis thereof by a drive unit,
   an endless conveyor having at least two traction means made of inherently flexible material circulating about the lower deflection roller and the upper deflection roller and offset from one another in an axial direction of the lower deflection roller and the upper deflection roller, wherein between each of the at least two traction means extend conveying strips distributed along the length of the at least two traction means,
   wherein the inner sides of the at least two traction means are furnished with cams made from inherently flexible material, which interact with a deflection roller of lower deflection roller and the upper deflection roller that is drivable so as to transmit torque,
   the conveying strips are connected by threaded bolts to the at least two traction means,
   the threaded bolts have heads, which are each embedded into one of the cams and contact an anchor plate integrated into the cam,
   and the threaded bolts extend through holes of the anchor plate and holes of the at least two traction means,
   wherein the threaded bolts are removable from the at least two traction means and in regions extending therein through the holes of the anchor plates, are form-fittingly coupled to the anchor plate in relation to a rotational movement.

2. The feederhouse according to claim 1, wherein the cams furnished with the threaded bolts are removable from the at least two traction means and the threaded bolts can be removed from the cams or are non-removably connected thereto.

3. The feederhouse according to claim 1, wherein the cams furnished with the threaded bolts are non-removably connected to the at least two traction means and the threaded bolts can be removed from the cam.

4. The feederhouse according to claim 1, wherein the threaded bolt can be removed from the cam through an inner opening of the cam adjacent to the head of the threaded bolt.

5. The feederhouse according to claim 1, wherein an axial dimension of the regions in which the threaded bolts extend through the holes of the at least two traction means corresponds at least to a thickness of one of the at least two traction means.

6. The feederhouse according to claim 5, wherein the threaded bolts are cylindrical in the regions thereof that extend through holes of the at least two traction means.

7. The feederhouse according to claim 5, wherein a diameter of the threaded bolts, in the regions thereof extending through holes of the at least two traction means, is greater than a thread diameter of the threaded bolts and the diameter of an opening in the conveying strip through which the threaded bolt extends.

8. The feederhouse according to claim 1, wherein material of the cam forms a portion of the cam that is sandwiched between the anchor plate and the at least two traction means, that has a concave curved surface facing away from the anchor plate and that abuts the at least two traction means.

9. Combine harvester having a feederhouse according to claim 1.

10. The feederhouse according to claim 1, wherein the cams comprise a first cam, wherein the threaded bolts comprise a first threaded bolt and a second threaded bolt, wherein the anchor plate is integrated into the first cam, wherein the anchor plate comprises two non-circular openings and wherein the first threaded bolt and the second threaded bolt each have non-cylindrical outer circumferential surfaces received within the non-circular openings to inhibit rotation of each of the first threaded bolt and the second threaded bolt relative to the anchor plate.

11. The feederhouse according to claim 10, wherein the anchor plate is integrated into the first cam with the first cam comprising:
   a first portion sandwiched between the anchor plate and one of the at least two traction means while contacting a first face of the anchor plate; and
   a second portion extending opposite to a second face of the anchor plate, the second portion contacting the second face.

12. The feederhouse according to claim 10, further comprising a first nut and a second nut threaded onto the first threaded bolt and the second threaded bolt, respectively, the first nut and the second nut being recessed within one of the conveying strips.

13. The feederhouse according to claim 12 further comprising a first washer and a second washer captured between the first nut and the second nut, respectively, and said one of the conveying strips.

14. The feederhouse according to claim 10, wherein the head of the first threaded bolt and the first cam extend opposite to and contact a same face of the anchor plate.

15. The feederhouse according to claim 1, wherein the cams comprise a first cam, wherein the threaded bolts comprise a first threaded bolt and a second threaded bolt, wherein the anchor plate is integrated into the first cam, wherein the anchor plate comprises two non-circular openings and wherein the anchor plate is integrated into the first cam, the first cam comprising:
   a first portion removable from one of the at least two traction means, the first portion being sandwiched between the anchor plate and one of the at least two traction means while contacting a first face of the anchor plate; and a second portion extending opposite to a second face of the anchor plate, the second portion contacting the second face and having an opening extending from an exterior of the cam to the anchor plate, the opening receiving a head of the first threaded bolt.

16. The feederhouse according to claim 15, further comprising a first nut and a second nut threaded onto the first threaded bolt and the second threaded bolt, respectively, the first nut and the second nut being recessed within one of the conveying strips.

17. A harvester conveyor comprising:
a first roller;
a second roller;
at least one endless belt extending about the first roller and the second roller;
conveying strips spaced along the at least one endless belt between the first roller and the second roller on a first side of the at least one endless belt, the conveying strips comprising an individual conveying strip;
cams separate from and coupled to the at least one endless belt on a second side of the at least one endless belt, the cams comprising an individual cam;
anchor plates embedded in each of the cams such that each cam extends opposite to each face of the anchor plate, the anchor plates comprising an individual anchor plate; and a first fastener having a first head recessed within the individual cam and extending through the individual cam, through the individual anchor plate and through the individual conveying strip; and a second fastener having a second head recessed within the individual cam and extending through the individual cam, through the individual anchor plate and through the individual conveying strip, wherein the anchor plate comprises two non-circular openings and wherein the first fastener and the second fastener each have non-cylindrical outer circumferential surfaces received within the non-circular openings to inhibit rotation of each of the first fastener and the second fastener relative to the anchor plate.

18. The harvester conveyor of claim 17, wherein the non-cylindrical outer circumferential surfaces are each formed on a shank of the respective first fastener and second fastener and wherein the non-clinical outer circumferential surfaces are polygonal.

19. The harvester conveyor of claim 17, wherein the individual cam has a continuous opening extending from an exterior of the cam completely through the individual cam and through the individual anchor plate and wherein the first fastener extends through the continuous opening.

20. The harvester conveyor of claim 17, wherein material of the cam forms a portion of the cam that is sandwiched between the anchor plate and the at least two traction means, that has a concave curved surface facing away from the anchor plate and that abuts the at least two traction means.

* * * * *